United States Patent
Shah et al.

(10) Patent No.: US 6,872,312 B1
(45) Date of Patent: Mar. 29, 2005

(54) METHOD OF USING HIGH MOLECULAR WEIGHT WATER SOLUBLE POLYMERS IN MEMBRANE BIOREACTOR SYSTEMS

(75) Inventors: Jitendra T. Shah, Naperville, IL (US); Kristine S. Salmen, Glen Ellyn, IL (US); John H. Collins, Bloomingdale, IL (US)

(73) Assignee: Nalco Company, Naperville, IL (US)

( * ) Notice: Subject to any disclaimer, the term of this patent is extended or adjusted under 35 U.S.C. 154(b) by 49 days.

(21) Appl. No.: 10/342,860

(22) Filed: Jan. 15, 2003

(51) Int. Cl.[7] .................................................. C02F 3/02
(52) U.S. Cl. ........................ 210/609; 210/625; 210/626; 210/650; 210/705
(58) Field of Search ................................ 210/609, 623, 210/624, 625, 626, 650, 705

(56) References Cited

U.S. PATENT DOCUMENTS 5,413,719 A    5/1995  Sivakumar et al.
6,224,769 B1 * 5/2001  Hasegawa et al. .......... 210/606

* cited by examiner

Primary Examiner—Robert A. Hopkins
(74) Attorney, Agent, or Firm—Michael B. Martin; Thomas M. Breininger (57) ABSTRACT

An activated sludge process for the clarification of wastewater comprising introducing the wastewater into a reactor where microorganisms consume organic material in the wastewater to form a mixed liquor comprising water, the microorganisms and an activated sludge; separating clarified water from the mixed liquor by filtration through a microfiltration or ultrafiltration membrane; separating the activated sludge from the mixed liquor; adding to the activated sludge at least one high molecular weight water soluble polymer to form a mixture of water and coagulated and flocculated solids; dewatering the coagulated and flocculated solids to form a mixture of dewatered solids and filtrate water; and recycling the filtrate water into the mixed liquor and a method of controlling polymer dosage, preferably using fluorescence emission spectroscopy.

14 Claims, 3 Drawing Sheets

METHOD OF USING HIGH MOLECULAR WEIGHT WATER SOLUBLE POLYMERS IN MEMBRANE BIOREACTOR SYSTEMS

TECHNICAL FIELD

This invention is an activated sludge process for the clarification of wastewater in which high molecular weight, water soluble polymers are used to aid in dewatering of the activated sludge prior to disposal of the sludge and recycling of the filtrate water from the dewatering back into the process. This invention is also a method of controlling polymer dosage so as to minimize the amount of residual polymer in the recycled filtrate water, preferably using fluorescence emission spectroscopy.

BACKGROUND OF THE INVENTION

Biological treatment of wastewater for removal of dissolved organics is well known and is widely practiced in both municipal and industrial plants. This aerobic biological process is generally known as the "activated sludge" process in which micro-organisms consume the organic compounds through their growth. The process necessarily includes sedimentation of the micro-organisms or "biomass" to separate it from the water and complete the process of reducing Biological Oxygen Demand (BOD) and TSS (Total Suspended Solids) in the final effluent. The sedimentation step is typically done in a clarifier unit. Thus, the biological process is constrained by the need to produce biomass that has good settling properties. These conditions are especially difficult to maintain during intermittent periods of high organic loading and the appearance of contaminants that are toxic to the biomass.

Typically, this activated sludge treatment has a conversion ratio of organic materials to sludge of about 0.5 kg sludge/kg COD (chemical oxygen demand), thereby resulting in the generation of a considerable amount of excess sludge that must to be disposed of. The expense for the excess sludge treatment has been estimated at 40–60 percent of the total expense of wastewater treatment plant. Moreover, the conventional disposal method of landfilling may cause secondary pollution problems. Therefore, interest in methods to reduce the volume and mass of the excess sludge has been growing rapidly.

Membranes coupled with biological reactors for the treatment of wastewater are well known, but are not widely practiced. In these systems, ultrafiltration (UF), microfiltration (MF) or nanofiltration (NF) membranes replace sedimentation of biomass for solids-liquid separation. The membrane can be installed in the bioreactor tank or in an adjacent tank where the mixed liquor is continuously pumped from the bioreactor tank and back producing effluent with much lower total suspended solids (TSS), typically less than 5 mg/L, compared to 20 to 50 mg/L from a clarifier.

More importantly, MBRs (membrane biological reactors) de-couple the biological process from the need to settle the biomass, since the membrane sieves the biomass from the water. This allows operation of the biological process at conditions that would be untenable in a conventional system including: 1) high MLSS (bacteria loading) of 10–30 g/L, 2) extended sludge retention time, and 3) short hydraulic retention time. In a conventional system, such conditions could lead to sludge bulking and poor settleability.

The benefits of the MBR operation include low sludge production, complete solids removal from the effluent, effluent disinfection, combined COD, solids and nutrient removal in a single unit, high loading rate capability, no problems with sludge bulking, and small footprint. Disadvantages include aeration limitations, membrane fouling, and membrane costs.

Membrane fouling can be attributed to surface deposition of suspended or dissolved substances. The MBR membrane interfaces with the biomass which contains aggregates of bacteria or "flocs", free bacteria, protozoan, and various dissolved microbial products (SMP). The term SMP has been adopted to define the organic compounds that are released into the bulk microbial mixed liquor from substrate metabolism (usually biomass growth) and biomass decay.

In operation, the colloidal solids and SMP have the potential of depositing on the surface of the membrane. Colloidal particles form layers on the surface of the membrane, called a "cake layer." The MBR processes are designed to use rising course air bubbles to provide a turbulent crossflow velocity over the surface of the membrane. This helps to maintain the flux through the membrane, by reducing the build up of a cake layer at the membrane surface.

In addition to cake formation on the membrane, small particles can plug the membrane pores, a fouling condition that may not be reversible. Compared to a conventional activated sludge process, floc (particle) size is reportedly much smaller in typical MBR units. Since MBR membrane pore size varies from about 0.04 to about 0.4 micrometers, particles smaller than this can cause pore plugging. Pore plugging increases membrane resistance and decreases membrane flux.

In the activated sludge process, soluble organic compounds are converted into biomass and gaseous waste products by microorganisms. The amount of biomass produced, termed "sludge yield," is related to the mass of carbon substrate in the influent per unit time. While biosolids production is lower in a MBR compared to ASP, removal or wasting of biosolids is necessary to maintain the overall performance of the system. Typical MBR biosolids concentration, expressed as mixed liquor suspended solids, is 1–2%, so that water is 98–99% of the wasted sludge. To reduce costs, therefore, it is preferable to dewater the sludge and decrease the volume prior to disposal. Typically, filtrate from the dewatering process is recycled back to the MBR.

Synthetic, water soluble polymers are commonly used to condition sludge prior to introduction into a dewatering device, such as a belt filter press or centrifuge. These polymers partition between the solids and the water phase, often leaving 5–50 ppm or more polymer product in the water (filtrate). These polymers have the potential to foul membranes similar to SMP membrane fouling. Because of the potential fouling effect of high molecular weight polymers on membranes, the use of such polymers in membrane systems has been patently avoided, including in ancillary dewatering processes where only filtrate is returned to the MBR.

Accordingly, there is an ongoing need for methods of using dewatering polymers in a manner that minimizes the amount of residual polymer in the dewatering process filtrate water in order to minimize the potential of membrane fouling while simultaneously achieving efficient dewatering performance in order to minimize sludge disposal costs.

SUMMARY OF THE INVENTION

This invention is an activated sludge process for the clarification of wastewater comprising
(i) introducing the wastewater into a reactor where microorganisms consume organic material in the wastewater to form a mixed liquor comprising water, the microorganisms and an activated sludge;
(ii) separating clarified water from the mixed liquor by filtration through a microfiltration or ultrafiltration membrane;
(iii) separating excess activated sludge from the mixed liquor;
(iv) adding to the excess activated sludge at least one high molecular weight water soluble polymer to form a mixture of water and coagulated and flocculated solids;
(v) dewatering the coagulated and flocculated solids to form a mixture of dewatered solids and filtrate water; and
(vi) recycling the filtrate water into the mixed liquor.

DETAILED DESCRIPTION OF THE INVENTION

Definitions of Terms

"Activated sludge" means a mixture of wastewater, microorganisms used to degrade organic materials in the wastewater, organic-containing material derived from cellular species, cellular by-products and/or waste products, or cellular debris. Activated sludge can also contain colloidal and particulate material (i.e. biomass/biosolids) and/or soluble molecules or biopolymers (i.e. polysaccharides, proteins, etc.). "Excess activated sludge" refers to the activated sludge that is continuously pumped from the bioreactor in order to maintain a constant sludge age in the bioreactor.

"Anionic monomer" means a monomer as defined herein which possesses a negative charge above a certain pH range. Representative anionic monomers include acrylic acid, and it's salts, including, but not limited to sodium acrylate, and ammonium acrylate, methacrylic acid, and it's salts, including, but not limited to sodium methacrylate, and ammonium methacrylate, 2-acrylamido-2-methylpropanesulfonic acid (AMPS), the sodium salt of AMPS, sodium vinyl sulfonate, styrene sulfonate, maleic acid, and it's salts, including, but not limited to the sodium salt, and ammonium salt, sulfonate, itaconate, sulfopropyl acrylate or methacrylate or other water-soluble forms of these or other polymerisable carboxylic or sulphonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, and the like.

"Anionic polymer" means a polymer having an overall negative charge above a certain pH range. The anionic polymer is prepared by vinyl addition polymerization of one or more anionic monomers or by copolymerization of one or more anionic monomers with one or more nonionic monomers. Preferred anionic polymers include polymers and copolymers of acrylic acid, methacrylic acid, acrylamidomethylpropane sulfonic acid, N-vinyl formamide and acrylamide.

"Cationic polymer" means a polymer having an overall positive charge. The cationic polymer is typically prepared by vinyl addition polymerization of one or more cationic monomers, by copolymerization of one or more cationic monomers with one or more nonionic monomers, or by polymerization of the cationic monomers with one or more anionic monomers and optionally one or more nonionic monomers to produce an amphoteric polymer.

While the polymer may be formed as a cationic polymer, it is also possible to react certain non-ionic vinyl addition polymers to produce cationically charged polymers. Polymers of this type include those prepared through the reaction of polyacrylamide with dimethylamine and formaldehyde to produce a Mannich derivative.

Preferred cationic polymers include polymers and copolymers of diallyldimethylammonium chloride, dimethylaminoethylacrylate methyl chloride quaternary salt, dimethylaminoethylacrylate benzyl chloride quaternary salt and acrylamide.

"Cationic monomer" means a monomer which possesses a net positive charge. Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride. Alkyl groups are generally $C_{1-4}$ alkyl.

"Conditioning" means precipitating soluble biopolymer and coagulating and flocculating the particulate and colloidal organic material in the activated sludge to form larger aggregates of particles.

"High molecular weight polymer" means a cationic or anionic polymer as described herein having a weight average molecular weight of at least about 1,000,000. Suitable polymers may have a molecular weight of 20,000,000 or more. The upper limit of molecular weight is limited only by the solubility or dispersibility of the polymer in water. The high molecular weight polymer may be a solution polymer, latex polymer, dispersion polymer or gel polymer. The high molecular weight polymer may also be a structurally modified polymer as described in PCT US01/10867.

"Monomer" means a polymerizable allylic, vinylic or acrylic compound. The monomer may be anionic, cationic or nonionic. Vinyl monomers are preferred, acrylic monomers are more preferred.

"Nonionic monomer" means a monomer which is electrically neutral. Representative nonionic monomers include acrylamide, methacrylamide, N-methylacrylamide, N,N-dimethyl(meth)acrylamide, N,N-diethyl(meth)acrylamide, N-isopropyl(meth)acrylamide, N-t-butyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acryate, N-vinyl-2-pyrrolidone, glycerol mono((meth)acrylate), 2-hydroxyethyl (meth)acrylate, 2-hydroxypropyl(meth)acrylate, vinyl methylsulfone, vinyl acetate, glycidyl(meth)acrylate, and the like.

"Reduced Specific Viscosity" (RSV) is an indication of polymer chain length and average molecular weight. The RSV is measured at a given polymer concentration and temperature and calculated as follows:

$$RSV = \frac{\left[\left(\frac{\eta}{\eta_o}\right) - 1\right]}{c}$$

wherein $\eta$=viscosity of polymer solution;
$\eta_o$=viscosity of solvent at the same temperature; and
c=concentration of polymer in solution.

As used herein, the units of concentration "c" are (grams/100 ml or g/deciliter). Therefore, the units of RSV are dl/g. The RSV is measured at 30° C. The viscosities $\eta$ and $\eta_o$ are measured using a Cannon-Ubbelohde semimicro dilution viscometer, size 75. The viscometer is mounted in a perfectly vertical position in a constant temperature bath adjusted to 30±0.02° C. The error inherent in the calculation of RSV is about 2 dl/g. Similar RSVs measured for two linear polymers of identical or very similar composition is one indication that the polymers have similar molecular weights, provided that the polymer samples are treated identically and that the RSVs are measured under identical conditions.

IV stands for intrinsic viscosity, which is RSV in the limit of infinite polymer dilution (i.e. the polymer concentration is equal to zero). The IV, as used herein, is obtained from the y-intercept of the plot of RSV versus polymer concentration in the range of 0.015–0.045 wt % polymer.

Preferred Embodiments

The MBR unit combines two basic processes: biological degradation and membrane separation-into a single process where suspended solids and microorganisms responsible for biodegradation are separated from the treated water by a membrane filtration unit. See *Water Treatment Membrane Processes*, McGraw-Hill, 1996, p 17.2. The entire biomass is confined within the system, providing for both control of the residence time for the microorganisms in the reactor (sludge age) and the disinfection of the effluent.

Figure 1:
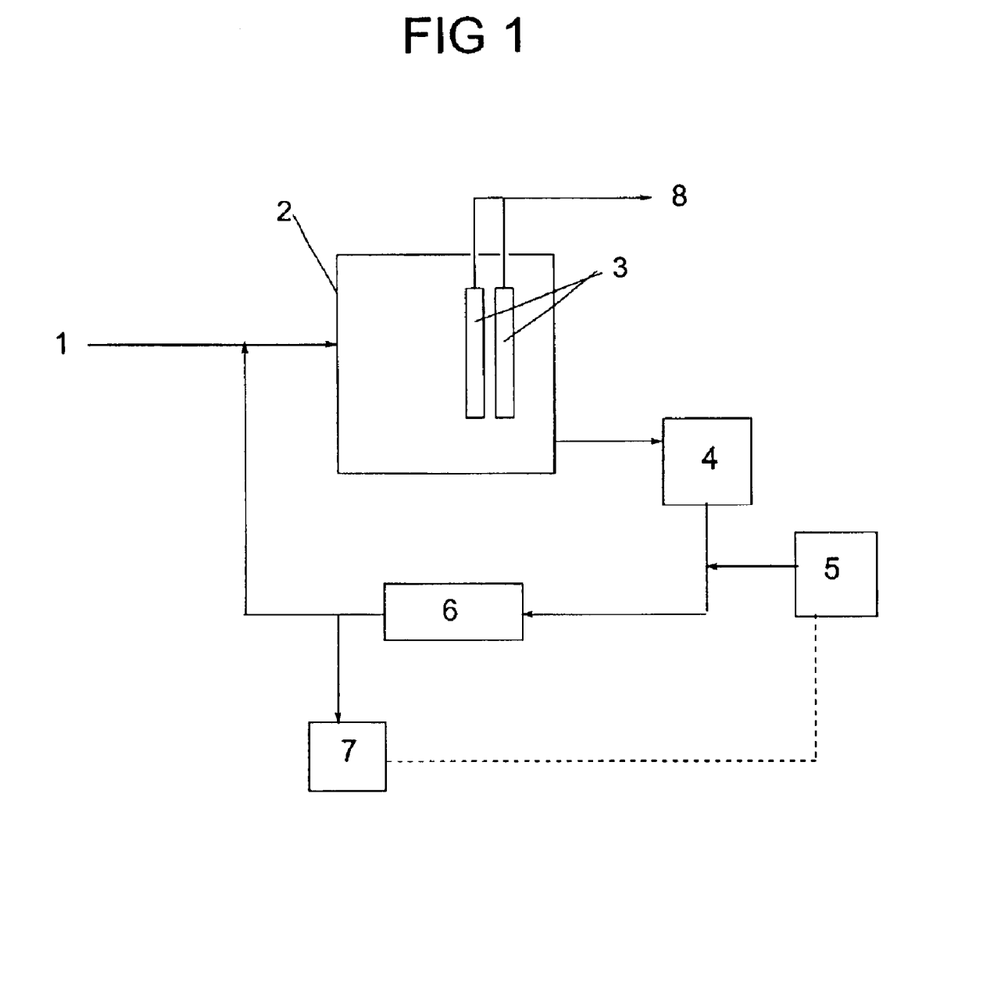
FIG. 1 is a schematic diagram of a typical membrane bioreactor system for the biological treatment of wastewater comprising a bioreactor tank 2, filtration membranes 3, sludge holding tank 4, polymer feeder 5 and dewatering apparatus 6. Also shown is an optional fluorometer 7, operationally connected with the polymer feeder 5 for controlling the dosage of the polymeric dewatering aid.

In a typical MBR unit shown in FIG. 1, influent wastewater 1 is pumped or gravity flowed into a bioreactor tank 2 where it is brought into contact with the microorganisms which biodegrade organic material in the wastewater. Aeration means such as blowers (not shown) provide oxygen to the biomass. The resulting mixed liquor contained in the bioreactor is filtered through membranes 3 under pressure or is drawn through the membrane under low vacuum. The membrane 3 may be immersed in the bioreactor tank as shown, or contained in a separate membrane module to which wastewater is continuously pumped from the bioreactor tank. Clarified water 8 is discharged from the system and excess activated sludge is pumped out of the bioreactor tank into a sludge holding tank 4 in order to maintain a constant sludge age. The filtration membrane 3 is regularly cleaned by backwashing, chemical washing, or both.

The excess sludge can contain up to about 99 percent water, and therefore is dewatered to reduce the sludge volume prior to disposal. This dewatering is aided by the use of the high molecular weight polymers of this invention to facilitate solid-liquid separation in the dewatering device 6. Filtrate water exiting the dewatering device is then recycled back into the bioreactor tank 2.

Membranes used in the MBR unit include ultra-, micro- and nanofiltration, inner and outer skin, hollow fiber, tubular, and flat, organic, metallic, ceramic, and the like. Preferred membranes for commercial application include hollow fiber with an outer skin ultrafilter, flat sheet (in stacks) microfilter and hollow fiber with an outer skin microfilter.

Preferred membrane materials include chlorinated polyethylene (PVC), polyvinylidene fluoride (PVDF), polyacrylonitrile (PAN), polysulfone (PSF), polyethersulfone (PES), polyvinylalcohol (PVA), cellulose acetate (CA), regenerated cellulose (RC) as well as inorganics.

The dewatering process discussed above is aided by the addition of one or more high molecular weight water soluble polymers.

The high molecular weight water soluble polymer of this invention is added to the activated sludge to promote the incorporation of colloidal particles, such as cell fragments and single bacterium contained therein into aggregate or floe structures and/or to increase the porosity of the cake layer. The water soluble polymers may be dry polymers, solution polymers, latex polymers or dispersion polymers.

"Latex polymer" means an invertible water-in-oil polymer emulsion comprising a cationic, amphoteric or zwitterionic polymer according to this invention in the aqueous phase, a hydrocarbon oil for the oil phase, a water-in-oil emulsifying agent and, potentially, an inverting surfactant. Inverse emulsion polymers are hydrocarbon continuous with the water-soluble polymers dispersed as micron sized particles within the hydrocarbon matrix. The latex polymers are then "inverted" or activated for use by releasing the polymer from the particles using shear, dilution, and, generally, another surfactant, which may or may not be a component of the inverse emulsion.

The preparation of water-in-oil emulsion polymers useful as dewatering aids is described in, for example, U.S. Pat. Nos. 2,982,749; 3,284,393; and 3,734,873. See also Hunkeler et al., "Mechanism, Kinetics and Modeling of the Inverse-Microsuspension Homopolymerization of Acrylamide", *Polymer* (1989), 30(1), 127–42; and Hunkeler et al., "Mechanism, Kinetics and Modeling of Inverse-Microsuspension Polymerization: 2. Copolymerization of Acrylamide with Quaternary Ammonium Cationic Monomers", *Polymer* (1991), 32(14), 2626–40.

Latex polymers are prepared by dissolving the desired monomers in the aqueous phase, dissolving the emulsifying agent(s) in the oil phase, emulsifying the water phase in the oil phase to prepare a water-in-oil emulsion, in some cases, homogenizing the water-in-oil emulsion, polymerizing the monomers dissolved in the water phase of the water-in-oil emulsion to obtain the polymer as a water-in-oil emulsion.

If so desired, a self-inverting surfactant can be added after the polymerization is complete in order to obtain the water-in-oil self-inverting emulsion.

"Dispersion polymer" means a water-soluble polymer dispersed in an aqueous continuous phase containing one or more inorganic/organic salts. Representative examples of polymeric dewatering aids prepared by dispersion polymerization of water-soluble monomers in an aqueous continuous phase are found in, for example U.S. Pat. Nos. 4,929,655; 5,006,590; 5,597,859; and 5,597,858, in European Patent Nos. 657,478; and 630,909 and in PCT/US01/09060.

A general procedure for the manufacture of dispersion polymers is as follows. The types and quantities of specific components in the formula (salts and stabilizer polymers, for example) will vary depending upon the particular polymer that is being synthesized.

An aqueous solution containing one or more inorganic salts, one or more monomers and any additional water-soluble monomers, any polymerization additives such as chelants, pH buffers, chain transfer agents, branching or cross-linking agents and one or more water-soluble stabilizer polymers is charged to a reactor equipped with a mixer, a thermocouple, a nitrogen purging tube, and a water condenser.

The monomer solution is mixed vigorously, heated to the desired temperature, and then a water-soluble initiator is added. The solution is purged with nitrogen while maintaining temperature and mixing for several hours. After this time, the products arc cooled to room temperature, and any post-polymerization additives are charged to the reactor. Water continuous dispersions of water-soluble polymers are free flowing liquids with product viscosities generally 100–10,000 cP, measured at low shear.

"Solution polymer" means a water soluble polymer in a water continuous solution.

In a solution polymerization process, one or more monomers are added to a vessel followed by neutralization with a suitable base. Water is then added to the reaction vessel, which is then heated and purged. Polymerization catalysts may also be added to the vessel initially or fed in gradually during the course of the reaction. Water soluble polymerization initiators such as any azo or redox initiator or combination thereof are added along with the monomer solution to the reaction mixture in separate feeds over the same amount of time. Heating or cooling may be used as necessary to control the reaction rate. Additional initiator may be used after addition is complete to reduce residual monomer levels.

"Dry polymer" means a polymer prepared as a dry powder by gel polymerization. The preparation of high molecular weight water-soluble polymers using a gel polymerization is generally performed as follows: an aqueous solution of water-soluble monomers, generally 20–60 percent concentration by weight, along with any polymerization or process additives such as chain transfer agents, chelants, pH buffers, or surfactants, is placed in an insulated reaction vessel equipped with a nitrogen purging tube. A polymerization initiator is added, the solution is purged with nitrogen, and the temperature of the reaction is allowed to rise uncontrolled. When the polymerized mass is cooled, the resultant gel is removed from the reactor, shredded, dried, and ground to the desired particle size.

In a preferred aspect of this invention, the polymer is a high molecular weight cationic 115 polymer.

In another preferred aspect, the high molecular weight cationic polymer is a polymer of acrylamide and one or more cationic monomers selected from diallyldimethylammmonium chloride, dimethylaminoethylacrylate methyl chloride quaternary salt and dimethylaminoethylacrylate benzyl chloride quaternary salt.

Polymer addition may be by conventional methods. For example, the polymer may be diluted with water to the desired concentration and then added intermittantly or continuously to the activated sludge. Some agitation of the mixture of sludge and flocculant may be necessary to bring about flocculation. Thereafter separation of the separated solids from liquid may be effected by conventional methods in the dewatering device, including digestion, sedimentation, flotation, centrifugation and filtration.

In a preferred aspect of this invention, the excess sludge is dewatered by a belt filter press or a centrifuge.

Additional sludge disintegration devices can be attached to the MBR to enhance sludge decay. Excess sludge from the bioreactor tank 2 is pumped into the disintegration device for further degradation. Examples of sludge disintegration devices include ozonation, alkaline treatment, heat treatment, ultrasound, and the like.

The wastewater may be pretreated before entering the MBR. For example, a bar screen, grit chamber or rotary drum screen may be used to achieve coarse solids removal.

In industrial plants where synthetic oils are present in the untreated wastewater, such as an oil refinery, pretreatment to remove oil is accomplished in units such as the inclined plate separator and the induced air flotation unit (IAF.). Often, a cationic flocculant, such as a co-polymer of DMAEM and AcAm, is used in the IAF unit to increase oil removal. Also, excess phosphate is sometimes precipitated in the bioreactor by the addition of metal salts such as ferric chloride, so that the phosphate does not pass through the membrane and into the final effluent.

Depending on the ultimate use of the water and the purity of the MBR permeate, the clarified wastewater may also be subjected to post treatment. For instance, in water reclamation where treated wastewater is ultimately recharged into an aquifer used as a source for drinking water, the permeate may be further treated with reverse osmosis (RO) to reduce the dissolved mineral content. If the water is to be recycled into a process, then the requirements of that process may necessitate further treatment of the permeate for removal of recalcitrant organics not removed by the MBR. Processes such as nanofiltration or carbon adsorption might be used in these cases. Finally, all biologically treated wastewater may be further disinfected prior to discharge into a receiving stream, generally by addition of sodium hypochlorite, although this is not required for discharge into a municipal sewer.

As noted above, the high molecular weight, water soluble polymers used to assist in dewatering of the activated sludge have the potential to foul the filtration membranes in systems such as the MBR. Therefore, the polymer dose must be carefully controlled in order to minimize the amount of residual polymer in the filtrate water which is recycled to the bioreactor.

Accordingly, in a preferred aspect the process of this invention further comprises the additional steps of:

vii) measuring the amount of high molecular weight water soluble polymer in the filtrate or mixed liquor; and viii) adjusting the amount of water soluble polymer added to the excess activated sludge to minimize the amount of polymer in the filtrate water or mixed liquor.

Residual polymer in the filtrate or mixed liquor may be detected by several means including laboratory techniques such as colloid titration or by electronic instrumentation to detect charge.

However, analytical techniques such as colloid titration are complicated and time consuming and do not permit a real time result, while electronic devices to determine charge are expensive and do not differentiate between charge associated with a polymer and charge from other sources, including the water, solids, or other constituents in the effluent. Furthermore, time consuming measurements are inefficient since the characteristics of a waste stream may vary considerably with time.

The use of fluorescent materials and fluorescence emission spectroscopy to optimize the dosage of polymeric dewatering aids is described in, for example, U.S. Pat. Nos. 5,413,719 and 5,645,799, incorporated herein by reference. The use of fluorescence emission spectroscopy permits on-line and real time monitoring of the dewatering aid so that any changes in the amount of treatment polymer being added to the system can be made immediately.

Accordingly, in a preferred aspect of this invention, the amount of polymer in the filtrate water or mixed liquor is measured by fluorescence emission spectroscopy.

In another preferred aspect, the measuring is performed by
a) adding to the excess activated sludge at least one fluorescent material to form a fluorescent complex between the fluorescent material and the water soluble polymer prior to the dewatering; and
b) detecting the amount of fluorescent complex in the filtrate water or the mixed liquor.

In practice, an amount of one or more inert fluorescent tracer materials proportional to the amount of polymeric dewatering aid is added together with the polymeric dewatering aid and the fluorescent signal of the resulting fluorescent complex is measured with a commercially available fluorometer. The amount of the fluorescent complex is determined by using a calibration curve to relate the amount of fluorescent signal detected to the amount of the fluorescent complex present and the amount of polymeric dewatering aid present is then calculated.

The tracer material preferably has a charge which is opposite to the charge carried by the polymer that is being monitored. For example, cationic flocculants are preferably monitored by an anionically charged tracer. Preferably, the tracer materials fluoresce at wavelengths detectable by instrumentation in real time, partition with the polymer, and are water soluble or dispersible in the water, emulsion, or sludge being treated.

Preferred tracer materials include resazurin, Tinopal cbs-x (distyryl biphenyl derivative), Tinopal rbs-200 (triazole-stilbene) and water soluble pyrene sulfonic acids including 1,3,6,8-pyrenetetrasulfonic acid sodium salt (PTSA), 8-hydroxy 1,3,6-pyrene trisulfonic acid sodium salt, pyrenesulfonic acid (mono) sodium salt, and the like. Other highly polar, fluorescent, anionic materials which are substantially water soluble, would also be useful in this invention. While the materials of this invention are preferably used as alkali metal salts, and preferably sodium salts, they may be also employed in the free acid form.

The tracer materials are typically employed in the smallest amount which is measurable by fluorometers. Accordingly, the materials may be employed at levels of from as little as several parts per billion to equal parts based on the weight of the cationic polyelectrolyte used in the process. Generally, the water soluble tracer materials are employed at a ratio of from about 1 part per billion to about 750,000 parts per million based on the polyelectrolyte used in the process. The tracer materials are preferably used in an amount of about 10 parts per billion to about 500,000 parts per million, more preferably about 100 parts per billion to about 200,000 parts per million based on the polymeric dewatering aid.

Alternatively, a fluorescent moiety may be incorporated into the treatment polymer itself, for example by incorporating a fluorescent monomer unit into the treatment polymer, or by post modification of the treatment polymer with a fluorescent moiety capable of forming a covalent bond with the treatment polymer. The fluorescent signal of the polymer is measured as described above, thereby providing a direct measurement of the amount of dewatering aid. The preparation and use of polymeric dewatering aids containing a fluorescent moiety is described in, for example, U.S. Pat. Nos. 6,312,644; 6,077,461; 5,986,030; 5,998,632; and PCT US0/81654, incorporated herein by reference.

Accordingly, in another preferred aspect of this invention, the measuring is performed by
a) adding to the excess activated sludge at least one fluorescent polymeric dewatering aid; and
b) detecting the amount of fluorescent polymeric dewatering aid in the filtrate water or the mixed liquor.

In another preferred aspect of this invention, the measuring is in the mixed liquor. Measuring in the mixed liquor is preferably accomplished using a hand-held fluorometer, available for example, from Turner Designs, Sunnyvale, Calif.

In another preferred aspect, the measuring is carried out continuously.

In another preferred aspect, the amount of water soluble polymer is adjusted continuously.

The foregoing may be better understood by reference to the following examples, which are presented for purposes of illustration and are not intended to limit the scope of this invention.

EXAMPLE 1

Pressure filtration bench tests are conducted to measure the effects of polymer in the filtrate water on membrane fouling. The pressure filtration test is conducted in an Amicon 8400 Stirred Cell (Amicon, Inc., Beverly, Mass.) having a cell capacity of 400 ml, membrane diameter of 43 mm and an effective membrane area of 76 $cm^2$. The membrane is a Kubota chlorinated polyethylene membrane having a negative zeta potential and 0.035 micron pore size. The test is conducted at a pressure of 5 psi and a mixing speed of 300 rpm.

Figure 2:
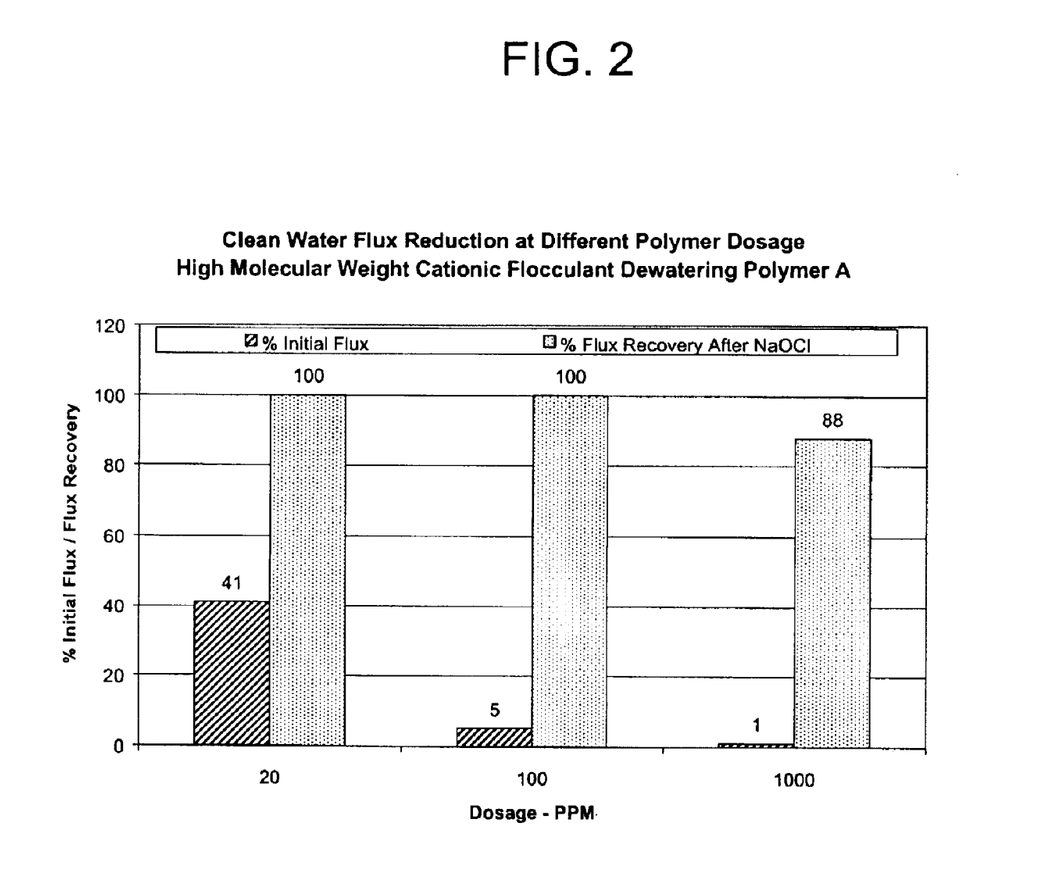
FIG. 2 is a plot of percent initial flux through a filtration membrane vs. polymer dosage for a high molecular weight cationic polymer dewatering aid showing that as little as 20 PPM of polymer mixed into the water can reduce membrane flux by almost 60 percent. At much higher polymer concentrations, membrane flux is reduced substantially more.

The initial water flux is measured (Jw-initial) after soaking the membrane in polymer solution for 2 days. The membrane is cleaned by rinsing with water and then again measuring the water flux (Jw-final). The water flux (Jw-clean) is also measured after further cleaning by a 30 minute soak in 1000 ppm NaOCl solution. The percent water flux recovery (FR) is then calculated from intial and final water fluxes as:

$FR=(Jw\text{-final}/Jw\text{-initial})\times 100$ for water washing or $FR=(Jw\text{-clean}/Jw\text{-initial})\times 100$ for chlorine cleaning The results are plotted in FIG. 2. In FIG. 2, Polymer A is a 30 percent solids acrylamide/dimethylaminoethylacrylate methyl chloride quaternary salt latex (50:50 mol:mol) having a RSV of 16–24 dl/g, available from Ondeo Nalco Company, Naperville, Ill.

As shown in FIG. 2, as little as 20 PPM of polymer mixed into water can reduce membrane flux. At much higher polymer concentrations, membrane flux is reduced substantially more.

EXAMPLE 2

Additional filtration tests are conducted using pilot-scale submerged membrane compartments. Each compartment has a capacity of 8 L and contains one Kubota membrane element with an active membrane area of 0.1 m$^2$. The air flow rate for membrane fouling is maintained at 10 L/min and the permeate flux is set at 17 LMH. The rate of membrane fouling is determined from the change in pump suction pressure with time.

Figure 3:
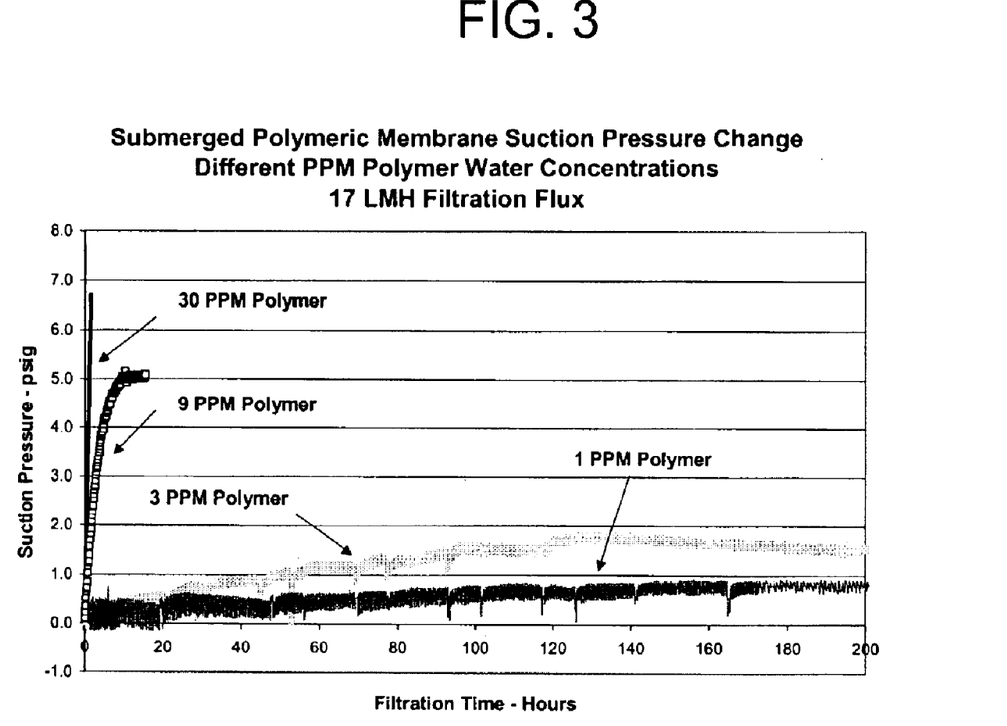
FIG. 3 is a plot of suction pressure vs. filtration time at various polymer dosages for a submerged membrane bioreactor filtration membrane showing that polymer concentrations of 9 and 30 PPM foul the membrane immediately while polymer concentrations of 1 and 3 PPM do not appreciably foul the membrane.

FIG. 3 shows the change in pump suction pressure as a function of time and polymer concentration. Higher pump suction pressures are caused by increased membrane fouling. Polymer concentrations of 9 and 30 PPM foul the membrane immediately. Polymer concentrations of 1 and 3 PPM did not appreciably foul the membrane based on the relatively low suction pressures.

EXAMPLE 3

A benchtop test for sludge conditioning is the free drainage test. Using a 500 ml graduated cylinder, a 200 ml aliquot of sludge is dosed with varying amounts of polymer, capped, mixed by inverting the cylinder, and poured onto a filter cloth to drain the liquid from the solids. The filtrate is collected in a beaker and weighed at timed intervals on an electronic, top loading balance. Weight is recorded in 5 second intervals by computer, and the accumulated drainage at 10 seconds is used for comparison of treatment efficacy. The water released from the sludge, called "filtrate" is tested for residual polymer using colloid titration with polyvinylsulfonate potassium salt (PVSK) solution and Toluidine Blue indicator. Additionally, a fluorescent dye, PTSA, is added to the polymer solution before addition to the sludge, and filtrate from the free drainage test is also tested for the dye using a fluorometer (Model TRASAR 3000, Turner Designs, Sunnyvale, Calif.) at the appropriate settings. Sludge from two municipal plants using full scale MBR processes is obtained for such testing. The data are shown in Tables 1–3 below.

In Tables 1–3, Sludge A and B represents sludge from two different municipal wastewater treatment facilities. Polymer B is a 42 percent solids acrylamide/dimethylaminoethylacrylate methyl chloride quaternary salt latex (50:50 mol:mol) having a RSV of about 21 dl/g. Polymer C is a 30 percent solids acrylamide/dimethylaminoethylacrylate methyl chloride quaternary salt latex (50:50 mol:mol) having a RSV of 16–24 dl/g. Polymers B and C are available from Ondeo Nalco Company, Naperville, Ill.

TABLE 1

Dewatering Bench Test for a Municipal Sludge (Sludge A)

| Polymer | ppm polymer | Drainage 10 sec. | Colloid Titration Product ppm | PTSA ppm |
|---|---|---|---|---|
| B | 0 | — | 0.0 | 0.001 |
| B | 100 | 42 | 2.1 | 0.005 |
| B | 125 | 80 | 2.1 | 0.008 |
| B | 150 | 88 | 6.3 | 0.014 |
| B | 175 | 106 | 7.3 | 0.015 |
| B | 225 | 114 | 18.9 | 0.028 |
| B | 275 | 112 | 35.7 | 0.067 |
| B | 325 | 114 | 54.6 | 0.095 |
| B | 375 | 114 | 54.6 | 0.102 |

As shown in Table 1, the optimum polymer dosage corresponds is about 225 PPM for sludge A. At dosages equal to and greater than the optimum dosage, the free polymer concentration in the filtrate increases dramatically. Additionally, the fluorescent tracer PTSA concentration is directly related to the filtrate polymer concentration, such that higher filtrate polymer concentrations correspond to higher PTSA concentrations. Thus, measuring PTSA concentration in filtrate can be used in a feed back control strategy to automate the dosing of polymer in sludge conditioning, resulting in minimum levels of polymer in filtrate. To minimize potential membrane fouling, the dosage should be set at 175 PPM Polymer B, which is below the optimum dosage, but will provide adequate drainage.

TABLE 2

Dewatering Bench Test for a Municipal Sludge (Sludge A)

| | | | Filtrate Analysis | |
|---|---|---|---|---|
| Polymer | Product Dosage ppm | Drainage 10 sec. g | PTSA ppm | Colloid Titration ppm |
| C | 25 | 46.7 | 0.025 | 10.6 |
| C | 50 | 66.1 | 0.022 | 10.6 |
| C | 63 | 89.0 | 0.022 | 7.1 |
| C | 75 | 113.5 | 0.019 | 12.3 |
| C | 100 | 126.7 | 0.02 | 12.3 |
| C | 125 | 131.9 | 0.029 | 38.8 |
| C | 150 | 133.7 | 0.048 | 52.9 |

TABLE 3

Dewatering Bench Test for a Municipal Sludge (Sludge B)

| | | | Filtrate Analysis | |
|---|---|---|---|---|
| Polymer | Dosage ppm | Drainage 10 sec. | PTSA ppm | colloid titration ppm product |
| C | 13 | 81.4 | 0.006 | 0 |
| C | 25 | 104.0 | 0.005 | 0 |
| C | 50 | 158.8 | 0.012 | 0 |
| C | 75 | 150.4 | 0.034 | 17.6 |
| C | 100 | 121.4 | 0.058 | 24.7 |
| C | 125 | 101.9 | 0.092 | 28.2 |
| C | 150 | 88.8 | 0.113 | 31.7 |
| C | 200 | 85.2 | 0.092 | 14.1 |

As shown in Tables 2 and 3, the optimum polymer dosage for Sludge A drainage is about 150 ppm. At this polymer dosage, the free polymer concentration is very high. To minimize potential membrane fouling the dosage should be set at 100 PPM Polymer C which is below the optimum dosage, but will provide adequate drainage. The optimum polymer dosage of 50 ppm for Sludge B drainage corresponds to minimal polymer concentration in filtrate. At higher polymer dosages, the free polymer concentration in the filtrate increases dramatically. To minimize potential membrane fouling the dosage should be set at 50 ppm or less.

Although this invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

What is claimed is:

1. An activated sludge process for the clarification of wastewater comprising
   (i) introducing the wastewater into a reactor where microorganisms consume organic material in the wastewater to form a mixed liquor comprising water, the microorganisms and an activated sludge;
   (ii) separating clarified water from the mixed liquor by filtration through a microfiltration or ultrafiltration membrane;
   (iii) separating excess activated sludge from the mixed liquor;
   (iv) adding to the excess activated sludge at least one high molecular weight water soluble polymer to form a mixture of water and coagulated and flocculated solids;
   (v) dewatering the coagulated and flocculated solids to form a mixture of dewatered solids and filtrate water; and
   (vi) recycling the filtrate water into the mixed liquor, wherein the high molecular weight water soluble polymer is added to the excess activated sludge in an amount sufficient to obtain a level of less than about 5 ppm of polymer in the mixed liquor.

2. The process of claim 1 wherein the polymer is a high molecular weight cationic polymer.

3. The process of claim 2 wherein the high molecular weight cationic polymer is a polymer of acrylamide and one or more cationic monomers selected from diallyldimethylammonium chloride, dimethylaminoethylacrylate methyl chloride quaternary salt and dimethylaminoethylacrylate benzyl chloride quaternary salt.

4. The process of claim 1 wherein the dewatering is accomplished by sedimentation, flotation, centrifugation or filtration.

5. The process of claim 4 wherein the dewatering is accomplished by a belt filter press or a centrifuge.

6. An activated sludge process for the clarification of wastewater comprising
   (i) introducing the wastewater into a reactor where microorganisms consume organic material in the wastewater to form a mixed liquor comprising water, the microorganisms and an activated sludge;
   (ii) separating clarified water from the mixed liquor by filtration through a microfiltration or ultrafiltration membrane;
   (iii) separating excess activated sludge from the mixed liquor;
   (iv) adding to the excess activated sludge at least one high molecular weight water soluble polymer to form a mixture of water and coagulated and flocculated solids;
   (v) dewatering the coagulated and flocculated solids to form a mixture of dewatered solids and filtrate water;
   (vi) recycling the filtrate water into the mixed liquor;
   (vii) measuring the amount of high molecular weight water soluble polymer in the filtrate or mixed liquor; and
   (viii) adjusting the amount of water soluble polymer added to the excess activated sludge to minimize the amount of polymer in the filtrate water or mixed liquor.

7. The process of claim 6 wherein the measuring is by fluorescence emission spectroscopy.

8. The process of claim 7 wherein the measuring is performed by
   a) adding to the excess activated sludge at least one fluorescent material to form a fluorescent complex between the fluorescent material and the water soluble polymer prior to the dewatering; and
   b) detecting the amount of fluorescent complex in the filtrate water or the mixed liquor.

9. The process of claim 7 wherein the measuring is performed by
   a) adding to the excess activated sludge at least one fluorescent polymeric dewatering aid; and
   b) detecting the amount of fluorescent polymeric dewatering aid in the filtrate water or the mixed liquor.

10. The process of claim 6 wherein the measuring is in the mixed liquor.

11. The process of claim 8 wherein the fluorescent material is added to the excess activated sludge in an amount of about 0.01 to about 200,000 ppm, based on the weight of the water soluble polymer.

12. The process of claim 7 wherein the measuring is carried out continuously.

13. The process of claim 7 wherein the amount of water soluble polymer is adjusted continuously.

14. The process of claim 6 wherein the amount of high molecular weight water soluble polymer added to the excess activated sludge is adjusted to obtain a level of less than about 5 ppm of polymer in the mixed liquor.

* * * * *